United States Patent
Minami

(10) Patent No.: US 8,274,427 B2
(45) Date of Patent: Sep. 25, 2012

(54) RADAR DEVICE

(75) Inventor: Yoshiaki Minami, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 356 days.

(21) Appl. No.: 12/603,723

(22) Filed: Oct. 22, 2009

(65) Prior Publication Data

US 2010/0123616 A1 May 20, 2010

(30) Foreign Application Priority Data

Nov. 14, 2008 (JP) ................................ 2008-292349

(51) Int. Cl.
- G01S 13/44 (2006.01)
- G01S 7/02 (2006.01)
- G01S 7/40 (2006.01)
- G01S 13/00 (2006.01)

(52) U.S. Cl. .............. 342/153; 342/73; 342/74; 342/75; 342/80; 342/147; 342/149; 342/165; 342/173; 342/175; 342/195

(58) Field of Classification Search .......... 342/147–158, 342/195, 73–81, 118, 127, 368–377, 89, 342/165–175; 343/700 R, 753, 755, 756
See application file for complete search history.

(56) References Cited

U.S. PATENT DOCUMENTS

| | | | | |
|---|---|---|---|---|
| 3,699,583 A * | 10/1972 | Beguin | ............................ | 343/756 |
| 3,701,160 A * | 10/1972 | Beguin | ............................ | 343/755 |
| 4,160,975 A * | 7/1979 | Steudel | .......................... | 342/149 |
| 4,394,659 A * | 7/1983 | Gellekink | ...................... | 342/151 |
| 4,616,230 A * | 10/1986 | Antonucci et al. | ............. | 342/373 |
| 4,642,642 A * | 2/1987 | Uurtamo | ........................ | 342/174 |
| 4,656,480 A * | 4/1987 | Allezard et al. | ............... | 342/151 |
| 4,994,810 A * | 2/1991 | Sinsky | ............................ | 342/151 |
| 5,059,968 A * | 10/1991 | Thompson et al. | ............. | 342/152 |
| 5,173,700 A * | 12/1992 | Chesley | ......................... | 342/149 |
| 5,315,304 A * | 5/1994 | Ghaleb et al. | .................. | 342/165 |
| 6,144,333 A * | 11/2000 | Cho | ................................ | 342/149 |
| 6,741,205 B2 * | 5/2004 | Nagasaku | ...................... | 342/174 |
| 6,930,637 B2 * | 8/2005 | Brothers et al. | ............... | 342/377 |
| 7,158,076 B2 * | 1/2007 | Fiore et al. | ..................... | 342/174 |
| 7,161,530 B2 * | 1/2007 | Christian et al. | .............. | 342/174 |
| 7,212,152 B2 * | 5/2007 | Nagasaku | ...................... | 342/174 |
| 7,417,584 B1 * | 8/2008 | Reifler et al. | .................. | 342/148 |

FOREIGN PATENT DOCUMENTS

| | | |
|---|---|---|
| JP | 11-287857 | 10/1999 |
| JP | 2001-166029 | 6/2001 |
| JP | 3433417 | 5/2003 |

OTHER PUBLICATIONS

Office Action issued Aug. 13, 2010, in Japanese Patent Application No. 2008-292349, filed Nov. 14, 2008 (with English-language translation).

* cited by examiner

*Primary Examiner* — Bernarr Gregory

(74) *Attorney, Agent, or Firm* — Oblon, Spivak, McClelland, Maier & Neustadt, L.L.P.

(57) ABSTRACT

A radar device including: a reception antenna that receives radio waves, includes at least three antennas and is arranged so that the phase center points thereof form an isosceles triangle; an arrival direction detection unit that detects an arrival direction of the radio waves by a phase monopulse method; and a phase correction unit that corrects a phase difference between phases of radio waves respectively received by two adjacent antennas among the three antennas based on the relationship of the phases of the radio waves respectively received by the three antennas.

4 Claims, 4 Drawing Sheets

WHEN RECEPTION ANTENNA INTERVAL d IS $\lambda/2$

RADAR DEVICE

The disclosure of Japanese Patent Application No. 2008-292349 filed on Nov. 14, 2008, including the specification, drawings and abstract is incorporated herein by reference in its entirety.

BACKGROUND OF THE INVENTION

1. Field of the Invention

The invention relates to a radar device of the phase-monopulse type that detects objects.

2. Description of the Related Art

Radar has conventionally been installed in vehicles to detect distance, relative speed and direction of obstacles (such as in Japanese Patent No. 3433417 or Japanese Patent Application Publication No. 2001-166029 (JP-A-2001-166029)).

Japanese Patent No. 3433417 discloses a phase monopulse radar device capable of detecting objects in the vertical direction by arranging array antennas, in which element antennas that receive radio waves reflected by an object are arranged in the longitudinal direction, horizontally while shifting in the vertical direction. According to this device, since a vehicle can distinguish a road or a sign on a road, erroneous detection of an object can be prevented. In addition, JP-A-2001-166029 discloses digital beamforming (DBF) radar.

An explanation of a method for calculating the arrival direction of radio waves using a phase monopulse system is explained with reference to FIGS. 4A and 4B. FIG. 4A indicates the relationship between the arrival direction of radio waves and the difference in path length of the radio waves in the case of receiving radio waves with two reception antennas. Phases of the reception signals of the two reception antennas are different form each other due to the path length difference of the radio waves. FIG. 4B indicates the relationship between radio wave arrival angle (horizontal axis, [deg]) and phase difference (vertical axis, [deg]) in the case of installing reception antennas horizontally and using a value of $\lambda/2$ for the antenna interval d. Once the phase angle $\Delta\phi$ has been determined, the arrival direction of the radio waves can be calculated based on the formula $\theta = \arcsin(\lambda \cdot \Delta\phi/(2 \cdot \pi \cdot d))$.

However, since detection of the phase difference of radio waves is carried out by detecting periodic shifts in the waveform of the radio waves, phase difference can only be detected within the range of $-\pi$ to $\pi$ [rad] due to this periodicity. Even if there is a phase difference that exceeds this range, it ends up being observed as a phase difference between $-\pi$ to $\pi$[rad] (and this state is referred to as the occurrence of phase aliasing). Thus, it was conventionally considered necessary to make the antenna interval smaller than the half-wavelength of the wavelength of a carrier wave in order to be able to uniquely specify the arrival direction of radio waves (see FIG. 4B). However, in order to prevent exacerbation of characteristics attributable to physical dimensions of the antenna element and inter-antenna coupling, it is not possible to make the antenna interval as small as possible, but rather the antenna interval is frequently made to be half of the wavelength $\lambda$.

In the case of detecting the arrival direction of radio waves by a phase monopulse system, the azimuth angle at which radio waves arrive can be detected in the case of arranging two reception antennas in a row horizontally. Similarly, the elevation angle at which radio waves arrive can be detected in the case of arranging two reception antennas in a row vertically. Thus, both the azimuth angle and elevation angle at which radio waves arrive can be detected by arranging three or more reception antennas two-dimensionally (namely, such that all of the reception antennas are not arranged in a straight line).

However, in the case of detecting objects around a vehicle, since the elevation angle range in which detection targets are present is limited, the antenna directionality pattern thereof is preferably wider in the direction of azimuth angle and narrower in the direction of elevation angle. Since array antennas are typically long in the vertical direction and short in the horizontal direction, an antenna arrangement that realizes an antenna directionality pattern as described above has a low degree of freedom. For example, in the case of arranging two rectangular antennas along the lengthwise direction of the antennas, the interval between the phase centers of the antennas becomes excessively wide, and the angle range over which the arrival direction of radio waves can be accurately detected using a phase monopulse system decreases. In addition, there is also the disadvantage of the dimensions in the vertical direction of the antenna housing becoming excessively large. Thus, in the case of detecting the arrival direction of radio waves with a phase monopulse system using antennas, it is essential to arrange the antennas in the direction perpendicular to the lengthwise direction of the antennas. For this reason, it has been difficult to detect both the azimuth angle and elevation angle at which radio waves arrive with a phase monopulse method using a plurality of antennas.

SUMMARY OF THE INVENTION

Therefore, the invention provides a radar device capable of detecting both azimuth angle and elevation angle at which radio waves arrive by a phase monopulse method using a plurality of antennas.

A first aspect of the invention is a radar device, including: a reception antenna that receives radio waves, is constituted by at least three antennas and is arranged so that phase center points thereof form an isosceles triangle; an arrival direction detection unit that detects an arrival direction of the radio waves by a phase monopulse method; and a phase correction unit that corrects a phase difference between phases of radio waves respectively received by two adjacent antennas among the three antennas based on a relationship of phases of radio waves respectively received by the three antennas.

According to this configuration, both azimuth angle and elevation angle at which radio waves arrive can be detected by a phase monopulse method using a plurality of antennas.

A distance between the phase center point of the center antenna among the three antennas and the phase center point of at least one of the remaining two antennas may be made to be larger than one-half the wavelength $\lambda$ of the radio waves.

Since the phase difference of radio waves received by these antennas can be corrected by the phase correction unit even if the distance between the phase center points of two adjacent antennas is larger than one-half the wavelength $\lambda$ of the radio waves, the degree of freedom of arrangement of the antennas increases.

The reception antenna may be configured such that a first distance between the phase center point of the center antenna among the three antennas and the phase center points of the remaining two antennas in a direction along the base of the isosceles triangle is one-half or less the wavelength $\lambda$ of the radio waves, a second distance between the phase center point of the center antenna and the phase center points of the remaining two antennas in a direction perpendicular to the base of the isosceles triangle is one-fourth or less the wavelength $\lambda$ of the radio waves, and in the case the absolute value of the sum of a first phase difference, which is the phase difference between a phase of radio waves received by one of the remaining two antennas among the three antennas and a phase of radio waves received by the center antenna, and a second phase difference, which is the phase difference between a phase of radio waves received by the other of the remaining two antennas and the phase of the radio waves received by the center antenna, is larger than 2×(second distance)×2π/λ, the phase correction unit may correct one of the first phase difference and the second phase difference, whose absolute value is larger than that of the other of the first phase difference and the second phase difference.

According to this configuration, the phase difference among the first phase difference and the second phase difference which is shifted from the true phase difference can be specified.

In the case of correcting one of the first phase difference and the second phase difference, whose absolute value is larger than that of the other of the first phase difference and the second phase difference, the phase correction unit may correct the phase difference by subtracting 2π from the phase difference if the value of the phase difference is positive, and may correct the phase difference by adding 23π to the phase difference if the value of the phase difference is negative.

According to this configuration, the phase difference among the first phase difference and the second phase difference which is shifted from the true phase difference can be corrected.

The direction along the base of the isosceles triangle may be substantially a horizontal direction.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

The following provides an explanation of an embodiment of the device as described in the invention with reference to the drawings.

Figure 1:
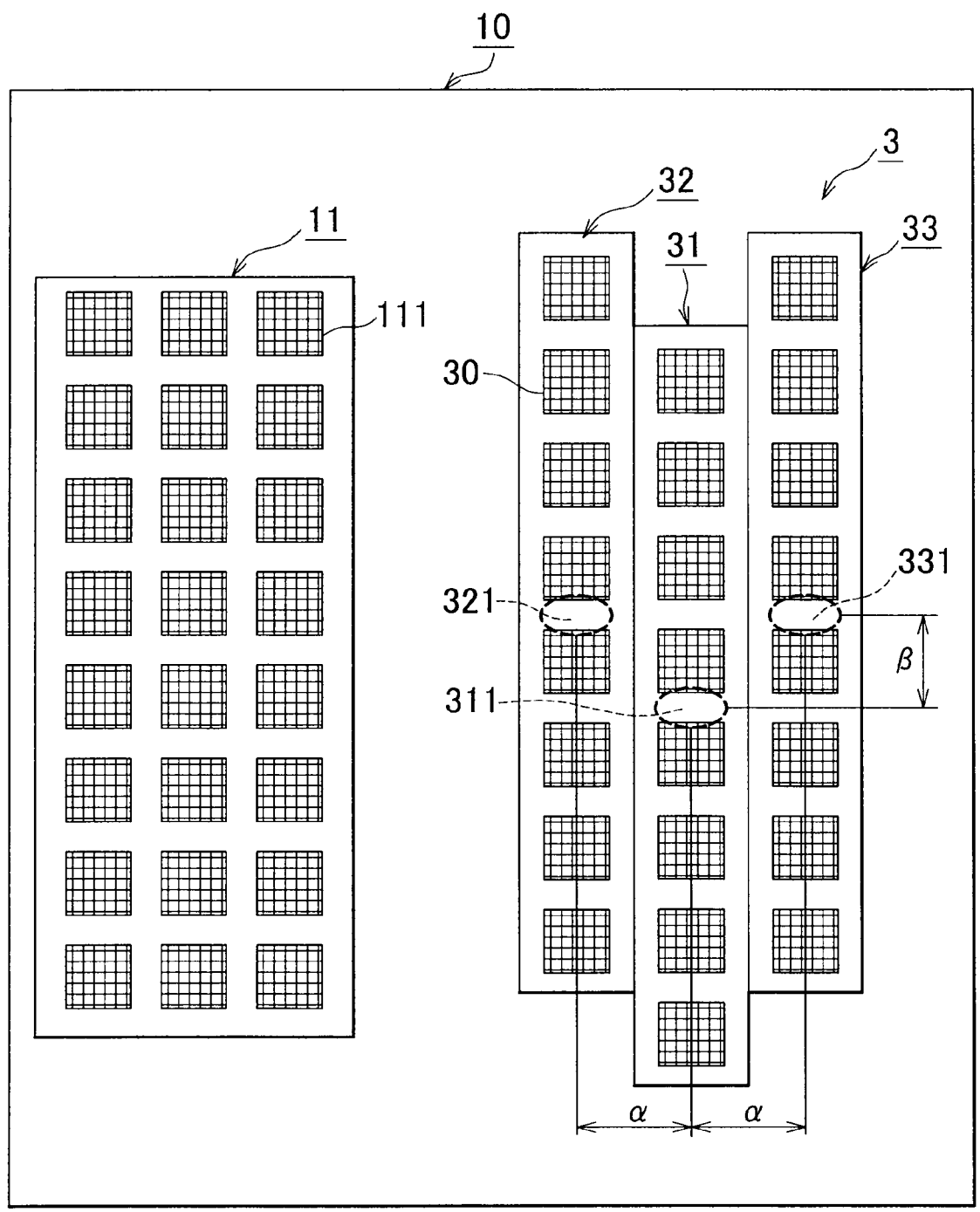
FIG. 1 is a block diagram of an antenna of a radar device as described in an embodiment of the invention.

FIG. 1 is a block diagram of an antenna 10 of a radar device as described in an embodiment of the invention. The antenna 10 is arranged, for example, facing towards the front or rear of a vehicle. The antenna 10 is installed, for example, so that the axial direction thereof is the vertical direction. The antenna 10 is provided with a transmission antenna 11 and a reception antenna 3. The transmission antenna 11 is provided with a plurality of transmission element antennas 111 on the same plane, and The reception antenna 3 is provided with array antennas 31 to 33. The array antennas 31 to 33 are respectively composed by arranging a plurality of reception element antennas 30 in a row within the same plane in the vertical direction. The array antennas 31 to 33 are arranged horizontally within the same plane in the order of array antenna 32, 31 and 33. The array antenna 31 functions as the "center antenna" of the invention.

Radio waves radiated by the transmission antenna 11 are reflected by an object and received by the reception element antennas 30.

Phase center points 311, 321 and 331 of the array antennas 31 to 33 are located nearly in the center of each of the array antennas 31 to 33. Array antennas 31 to 33 are arranged by shifting the location of the phase center point of the center array antenna 31 in the vertical direction with respect to the other array antennas so that the phase center points 311, 321 and 331 form an isosceles triangle overall. Here, this isosceles triangle is made to be such that the distance between the phase center point 311 and the phase center point 321 and the distance between the phase center point 311 and the phase center point 331 are equal. As a result of arranging in this manner, the direction in which radio waves arrive can be detected based on the phase differences between phases of each radio wave received by the array antennas 31 to 33 with respect to not only the horizontal direction but also the vertical direction. The reception antenna 3 is able to detect the arrival direction of radio waves, namely the direction in which an object (such as an obstacle) is present (horizontal and vertical directions) based on the phase differences.

Furthermore, in the following explanation, the interval in the horizontal direction between the phase center point 311 and the phase center point 321 as well as the interval in the horizontal direction between the phase center point 311 and the phase center point 331 are designated as α, while the interval in the vertical direction between the phase center point 311 and the phase center 321 point as well as the interval in the vertical direction between the phase center point 311 and the phase center point 331 are designated as β as shown in FIG. 1. This embodiment is premised on the above-mentioned a being one-half or less the radio wave wavelength λ (α≦λ/2), and the above-mentioned β being one-fourth or less the radio wave wavelength λ(β≦λ/4).

Figure 2:
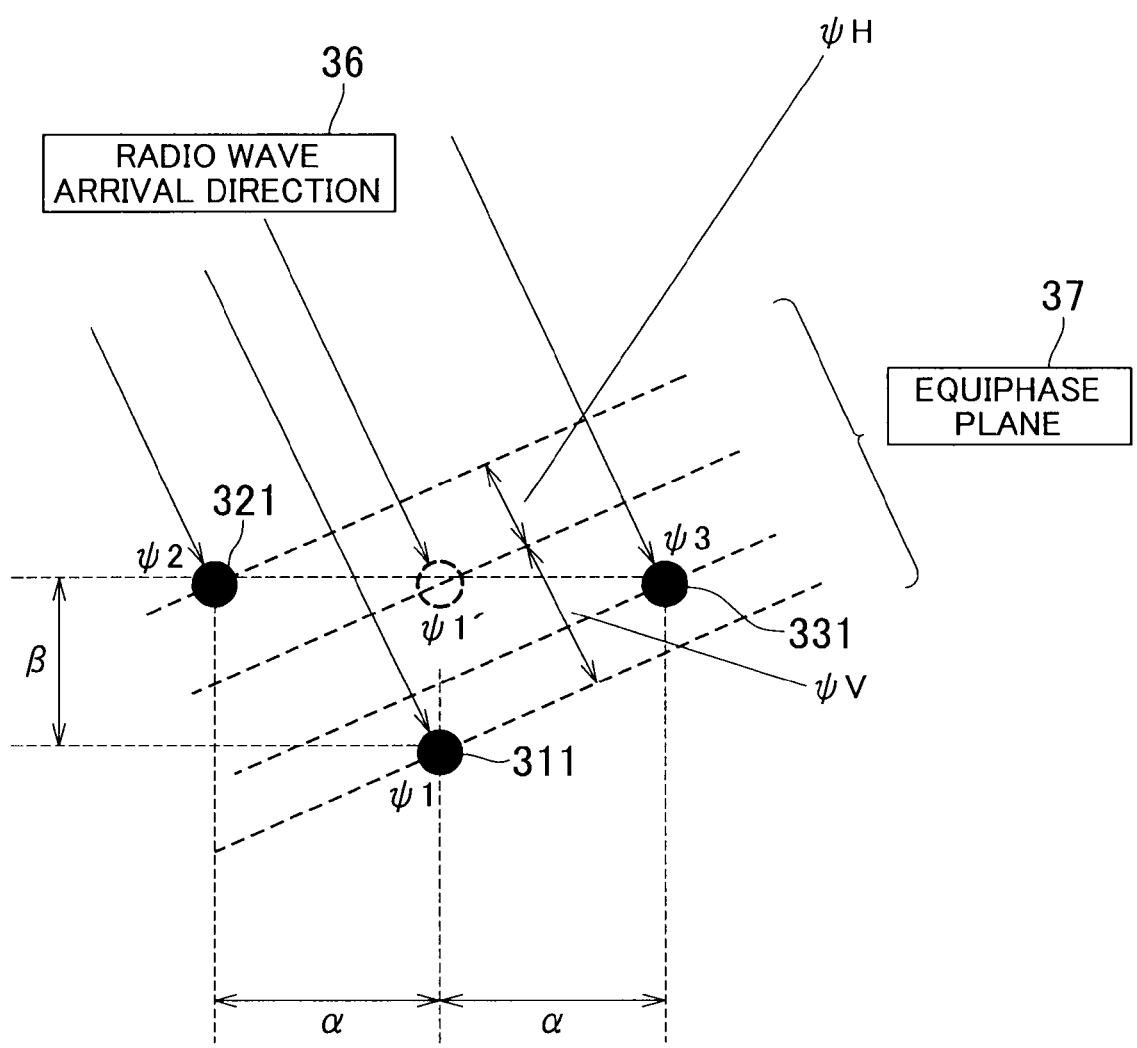
FIG. 2 shows the relationship of phase difference at each phase center of a radar device as described in an embodiment of the invention.

Next, the following provides an explanation of the relationship of the phases of radio waves received by each of the array antennas 31 to 33 of the reception antenna 3 using FIG. 2. The three black dots in FIG. 2 represent the positional relationship of the phase center points 311, 321 and 331 shown in FIG. 1. An equiphase plane 37 is a plane in which each of the phases of radio waves arriving from a prescribed radio wave arrival direction 36 is equal. Each of the four broken lines perpendicular to the radio wave arrival direction 36 shown in FIG. 2 is an equiphase plane 37. Although the equiphase planes 37 are actually planes, they are represented with straight lines in FIG. 2 for the sake of convenience.

Each of the radio waves received by the array antennas 31 to 33 is input to a signal processing unit not shown. The phases ψ1, ψ2 and ψ3 represent the phases of radio waves received at each phase center point 311, 321 and 331. The signal processing unit calculates the phase difference ψ21 (=ψ2−ψ1) and the phase difference ψ31 (=ψ3−ψ1) based on the phases ψ1, ψ2 and ψ3.

The values of the phase differences ψ21 and ψ31 are inherently not necessarily values from −π to π, but rather n·2π+p (where, "•" is a symbol that indicates multiplication, n is an integer and −π<p<π). However, the phase differences ψ21 and ψ31 are represented with values within the range of −π to π, and are used in processing to be described later.

A virtual antenna is placed in the center of the phase center points 331 and 321, and the phase ψ1' represents the phase of radio waves received at that phase center point. At this time, a phase difference ψV in the vertical direction and a phase difference ψH in the horizontal direction between phases of radio waves respectively received by two adjacent allay antennas can be determined according to the following formulas: $\psi V=\psi 1'-\psi 1=((\psi 2-\psi 1)+(\psi 3-\psi 1))/2=(\psi 21+\psi 31)/2$ (Formula 1); and $\psi H=\psi 2-\psi 1'=((\psi 2-\psi 1)-(\psi 3-\psi 1))/2=(\psi 21-\psi 31)/2$ (Formula 2).

Here, although the phase differences $\psi 21$ and $\psi 31$ are required to be true in order to correctly calculate the phase differences $\psi V$ and $\psi H$, there is the possibility of the phase differences $\psi 21$ and $\psi 31$ shifting by an integral multiple of $2\pi$ in either the positive direction or negative direction from the true values thereof. Therefore, the signal processing unit suitably corrects the values of the phase differences $\psi 21$ and $\psi 31$. The signal processing unit functions as the "phase correction unit" and "arrival direction detection unit" of the invention.

(Correction Method of Phase Differences $\psi 21$ and $\psi 31$) The following provides an explanation of a method for correcting the phase differences $\psi 21$ and $\psi 31$ using FIG. 2. The phase differences $\psi 21$ and $\psi 31$ are corrected according to whether or not the phase difference $\psi V$ in the vertical direction as determined based on the phase difference $\psi 21$ and the phase difference $\psi 31$ is a value within the range of possible values, which is determined based on the interval $\beta$ in the vertical direction between the phase center point 311 and the phase center points 321,331.

In the case both the phase differences $\psi 21$ and $\psi 31$ are true, since $\psi V$ can only be a value that is within the range of $-\beta \cdot (2\pi/\lambda)$ to $\beta (2\pi/\lambda)$, the expression $|(\psi 21+\psi 31)/2| \leq \beta(2\pi/\lambda)$, namely $|\psi 21+\psi 31| \leq 2 \cdot \beta (2\pi/\lambda)$ (Formula 3) ought to be valid from the above-mentioned Formula 1. Here, since $\beta \leq \lambda/4$ according to the previously stated premise, possible values of $\psi 21+\psi 31$ are within the range of $-\pi$ to $\pi$. However, in the case either one of the phase differences $\psi 21$ and $\psi 31$ has shifted by an integral multiple of $2\pi$ from the true value, the value of $\psi 21+\psi 31$ also shifts by an integral multiple of $2\pi$ from the true value, and the Formula 3 is no longer satisfied. On the basis thereof, in the case the Formula 3 is not satisfied, at least one of either the phase difference $\psi 21$ and the phase difference $\psi 31$ can be determined to have shifted from the true value.

However, as long as $\alpha$ is equal to or less than $\lambda/2$ ($\alpha \leq \lambda/2$) and $\beta$ is equal to or less than $\lambda/4$ ($\beta \leq \lambda/4$) as indicated by the previously stated premise, the possibility of both the phase differences $\psi 21$ and $\psi 31$ shifting from the true values is zero. Thus, if a phase difference is assumed to have shifted, only one of either the phase difference $\psi 21$ or $\psi 31$ has been shifted. In addition, as long as $\alpha$ is equal to or less than $\lambda/2$ ($\alpha \leq \lambda/2$) and $\beta$ is equal to or less than $\lambda/4$ ($\beta \leq \lambda/4$), there is no possibility of the phase difference $\psi 21$ or $\psi 31$ shifting by $4\pi$ or more. Thus, if a phase difference is assumed to have shifted, the shift is only $2\pi$ in the positive direction or negative direction from the true value.

In the case it is determined from the above-mentioned Formula 3 that either one of the phase difference $\psi 21$ or $\psi 31$ has shifted from the true value, one of the phase difference $\psi 21$ and the phase difference $\psi 31$ whose absolute value is larger than that of the other is determined to be the false value that has shifted from the true value. A phase difference shifts from the true value by $2\pi$ in the case the true value has a value outside the range of $-\pi$ to $\pi$. In addition, $|\psi 21-\psi 31|$ is equal to or less than $2\pi$ ($|\psi 21-\psi 31| \leq 2\pi$) as a result of setting $\alpha$ to a value equal to or less than $\lambda/2$ ($\alpha \leq \lambda/2$). Thus, one of the phase difference $\psi 21$ and the phase difference $\psi 31$ whose absolute value is larger than that of the other can be determined to have an false value.

In the case the true value has a value outside the range of $-\pi$ to $\pi$, the false value is a value that has shifted by $2\pi$ from the true value and the sign of that value has inverted. For example, The false value is $\pi-\gamma$ if the true value is $-\pi-\gamma$, and the sign of $-\pi-\gamma$ differs from the sign of $\pi-\gamma$ since the value of $\gamma$ cannot be larger than $\pi$ according to the previously stated premise. Thus, in the case the value of a phase difference among the phase differences $\psi 21$ and $\psi 31$ that has been determined to be false is a positive value, that value can be corrected to the true value by subtracting $2\pi$ from the value of that phase difference. Similarly, in the case the value of a phase difference that has been determined to be false is a negative value, that value can be corrected to the true value by adding $2\pi$ to the value of that phase difference.

Figure 3:
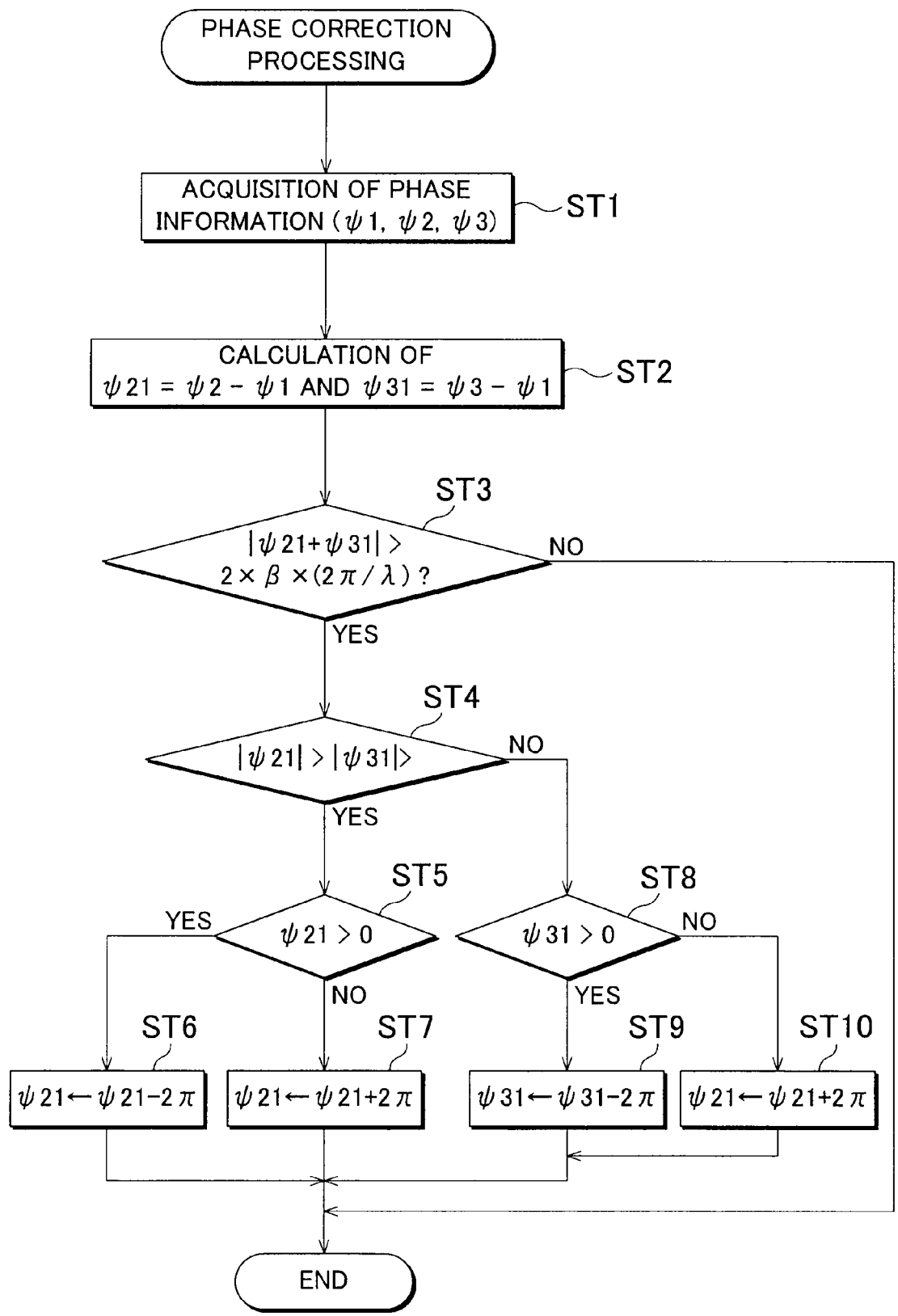
FIG. 3 is a flow chart of phase correction processing as described in an embodiment of the invention.
Figure 4A:
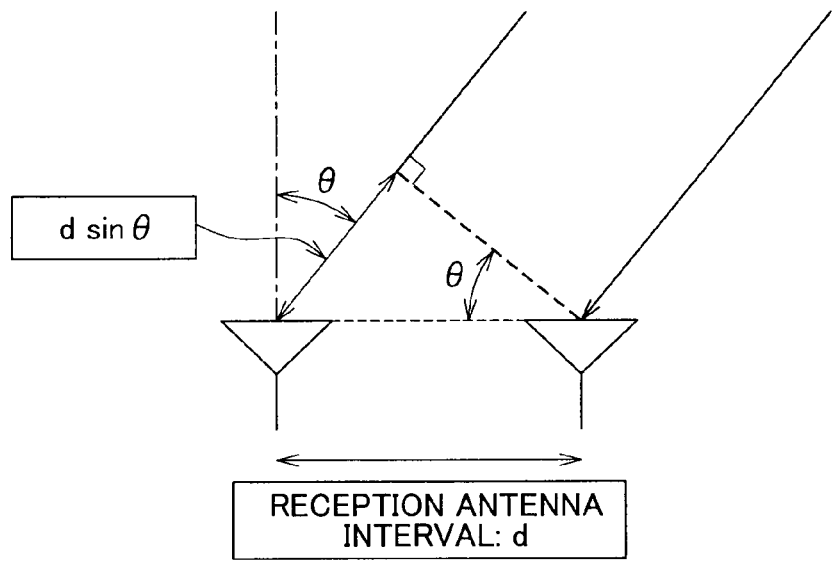
FIGS. 4A and 4B show the relationship between phase difference and angle in a phase monopulse system.
Figure 4B:
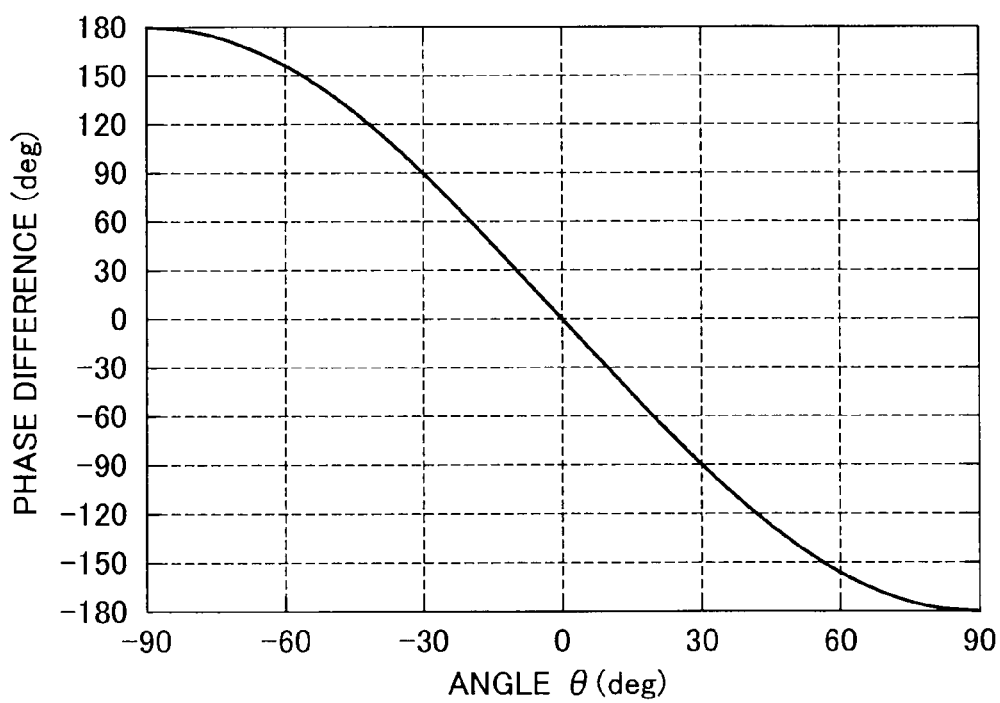

Next, an example is indicated of phase correction processing carried out by the above-mentioned signal processing unit using the flow chart of FIG. 3.

In ST1, the signal processing unit acquires phase information (phases $\psi 1$, $\psi 2$ and $\psi 3$) of radio waves received by the array antennas 31 to 33.

In ST2, the signal processing unit calculates the phase difference $\psi 21$ ($=\psi 2-\psi 1$) and the phase difference $\psi 31$ ($=\psi 3-\psi 1$).

In ST3, the signal processing unit determines whether or not the relationship of $|\psi 21+\psi 31|>2 \cdot \beta \cdot (2\pi/\lambda)$ is satisfied. If the result of this determination is affirmative (YES), then one of either of the phase differences $\psi 21$ and $\psi 31$ is false, and the signal processing unit carries out correction processing starting in ST4. If the result of this determination is negative (NO), since both of the phase differences $\psi 21$ and $\psi 31$ are true, processing ends without correcting the phase differences $\psi 21$ and $\psi 31$.

In ST4, the signal processing unit determines whether or not the absolute value of the phase difference $\psi 21$ is larger than the absolute value of the phase difference $\psi 31$. If the result of this determination is affirmative (YES), the flow proceeds to ST5. If the result of this determination is negative (NO), the flow proceeds to ST8.

In ST5, the signal processing unit determines whether or not the phase difference $\psi 21$ is greater than zero. In the case the phase difference $\psi 21$ is greater than zero (YES in ST5), the signal processing unit corrects the phase difference $\psi 21$ and uses the value of $\psi 21-2\pi$ as the true value of the phase difference $\psi 21$ (ST6). In the case the phase difference $\psi 21$ is zero or less (NO in ST5), the signal processing unit corrects the phase difference $\psi 21$ and uses the value of $\psi 21+2\pi$ as the true value of the phase difference $\psi 21$ (ST7).

In ST8, the signal processing unit determines whether or not the phase difference $\psi 31$ is greater than zero. In the case the phase difference $\psi 31$ is greater than zero (YES in ST8), the signal processing unit corrects the phase difference $\psi 31$ and uses the value of $\psi 31-2\pi$ as the true value of the phase difference $\psi 31$ (ST9). In the case the phase difference $\psi 31$ is zero or less (NO in ST8), the signal processing unit corrects the phase difference $\psi 31$ and uses the value of $\psi 31+2\pi$ as the true value of the phase difference $\psi 31$ (ST10).

(Calculation of Radio Wave Arrival Direction) Next, an explanation is provided of the method used to calculate the arrival direction (elevation and azimuth angles) of radio waves. The signal processing unit calculates the previously described phase differences $\psi V$ and $\psi H$ according to the above-mentioned Formulas 1 and 2 based on the true values of the phase differences $\psi 21$ and $\psi 31$ corrected in the manner described above.

Next, the signal processing unit determines the azimuth angle $\phi$ and the elevation angle $\theta$ of the radio wave arrival direction 36 using the phase differences $\psi V$ and $\psi H$ calculated in the manner described above. Here, when the azimuth angle $\phi$ and the elevation angle $\theta$ are calculated by applying the phase differences $\psi V$ and $\psi H$ to a phase monopulse calculation formula, the values of the azimuth angle $\phi$ and the elevation angle $\theta$ can be calculated as shown below.

$$\theta=\arcsin(\lambda \cdot \psi V/(2 \cdot \pi \cdot \beta)) \quad \text{(Formula 4)}$$

$$\phi=\arcsin(\lambda \cdot \psi H/(2 \cdot \pi \alpha \cdot \cos \theta)) \quad \text{(Formula 5)}$$

The following provides a supplementary explanation of the above examples.

In FIG. 1, the reception antenna 3 may be provided with array antennas in addition to the array antennas 31, 32 and 33. In this case, among the plurality of array antennas that compose the reception antenna 3, at least three of the array antennas are arranged such that their phase center points form an isosceles triangle. In addition, a plurality of sets of the reception antenna 3 may be provided. In addition, the axes of the array antennas 31, 32 and 33 are not necessarily required to each be along the vertical direction. The effects of the invention are demonstrated as long as the array antennas of a plurality of array antennas provided by the reception antenna 3 are arranged such that the phase center points of three adjacent array antennas form an isosceles triangle, regardless of the direction of the isosceles triangle (whether the apex or base is on the upper side). In addition, the transmission antenna 11 and the reception antenna 3 are not required to lie within the same plane. Moreover, although the reception antenna 3 and each of the reception element antennas 30 were indicated to be lying in the same plane in the explanation of FIG. 1, a level difference may be provided there between in consideration of design. In addition, the plurality of antennas that compose the reception antenna 3 are not limited to array antennas, but rather other types of antennas may be used. In addition, a range of possible values of the phase difference in a vertical direction, which is a phase difference between phases of radio waves respectively received by two adjacent antennas among the three antennas may be determined based on a positional relationship of the three antennas, and the phase difference between phases of radio waves respectively received by two adjacent antennas among the three antennas may be corrected according to whether or not the phase difference in the vertical direction determined based on phases of the radio waves respectively received by the three antennas is a value within the range of possible values.

What is claimed is:

1. A radar device comprising:
   a reception antenna that receives radio waves, the radar device detecting an arrival direction of the radio waves by a phase monopulse method, wherein:
   the reception antenna includes at least three antennas,
   the three antennas are arranged so that phase center points thereof form an isosceles triangle,
   the radar device further comprising phase correction means for correcting a phase difference between phases of radio waves respectively received by two adjacent antennas among the three antennas based on a relationship of phases of radio waves respectively received by the three antennas,
   a distance between the phase center point of the center antenna among the three antennas and the phase center point of at least one of the remaining two antennas is larger than one-half the wavelength $\lambda$ of the radio waves,
   a distance a between the phase center point of the center antenna among the three antennas and each of the phase center points of the remaining two antennas in a direction along the base of the isosceles triangle is one-half or less the wavelength $\lambda$ of the radio waves,
   a distance b between the phase center point of the center antenna and the phase center points of the remaining two antennas in a direction perpendicular to the base of the isosceles triangle is one-fourth or less the wavelength $\lambda$ of the radio waves, and
   in the case the absolute value of the sum of a phase difference $\psi 21$ ($-\pi \leq \psi 21 \leq \pi$), which is the phase difference between the phase of radio waves received by one of the remaining two antennas among the three antennas and the phase of radio waves received by the center antenna, and a phase difference $\psi 31$ ($-\pi \leq \psi 31 \leq \pi$), which is the phase difference between the phase of radio waves received by the other of the remaining two antennas and the phase of the radio waves received by the center antenna, is larger than $2 \times b \times 2\pi/\lambda$, the phase correction means corrects one of the phase difference $\psi 21$ and the phase difference $\psi 31$, whose absolute value is larger than that of the other of the phase difference $\psi 21$ and the phase difference $\psi 31$.

2. The radar device according to claim 1, wherein, in the case of correcting one of the phase difference $\psi 21$ and the phase difference $\psi 31$, whose absolute value is larger than that of the other of the phase difference $\psi 21$ and the phase difference $\psi 31$, the phase correction means corrects the phase difference by subtracting $2\pi$ from the phase difference if the value of the phase difference to be corrected is positive, and corrects the phase difference by adding $2\pi$ to the phase difference if the value of the phase.

3. The radar device according to claim 2, wherein the direction along the base of the isosceles triangle is substantially a horizontal direction.

4. The radar device according to claim 1, wherein the direction along the base of the isosceles triangle is substantially a horizontal direction.

* * * * *